(No Model.)

I. E. STOREY.
ELECTRIC LOCOMOTIVE.

No. 562,502.

Patented June 23, 1896.

WITNESSES:
Frank S. Ober.
Jos. Juhl.

INVENTOR
Imle E. Storey
BY
Rosenbaum
ATTORNEY.

UNITED STATES PATENT OFFICE.

IMLE E. STOREY, OF BOULDER, COLORADO, ASSIGNOR TO THE STOREY ELECTRIC DRILL AND POWER COMPANY, OF COLORADO.

ELECTRIC LOCOMOTIVE.

SPECIFICATION forming part of Letters Patent No. 562,502, dated June 23, 1896.

Application filed June 29, 1892. Serial No. 438,455. (No model.)

*To all whom it may concern:*

Be it known that I, IMLE E. STOREY, a citizen of the United States, residing at Boulder, in the county of Boulder and State of Colorado, have invented certain new and useful Improvements in Electric Locomotives, of which the following is a full, clear, and exact description.

The invention herein described comprehends a plan for mounting an electric motor whereby certain advantages are obtained in starting and moving the load.

The invention is particularly adapted for electric locomotives, vehicles, hoists, &c., where the entire load is to be moved at the start.

By the use of this invention the excessive current which an ordinary motor draws when starting a load is avoided and a saving thereby obtained in the generating plant.

The invention will be described in connection with a locomotive, and in the accompanying drawings—

Figure 1:
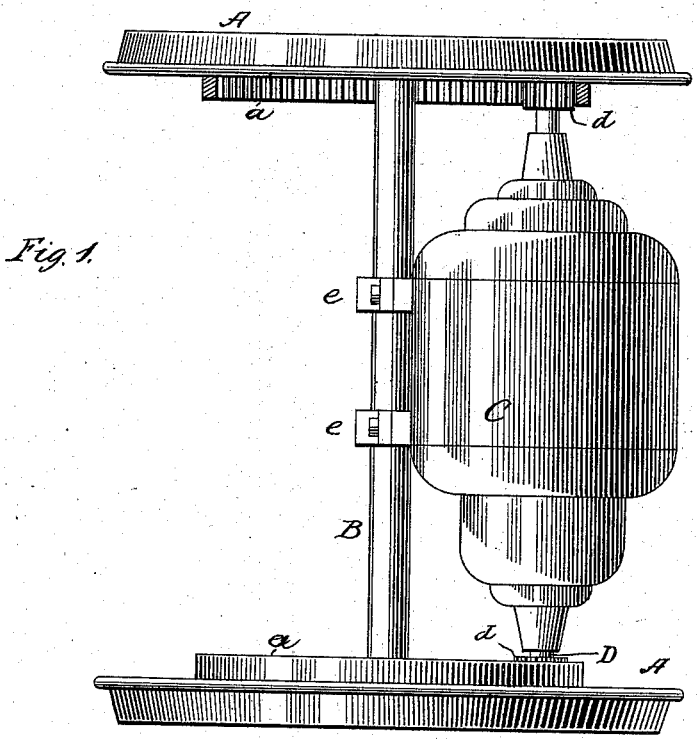
Figure 2:
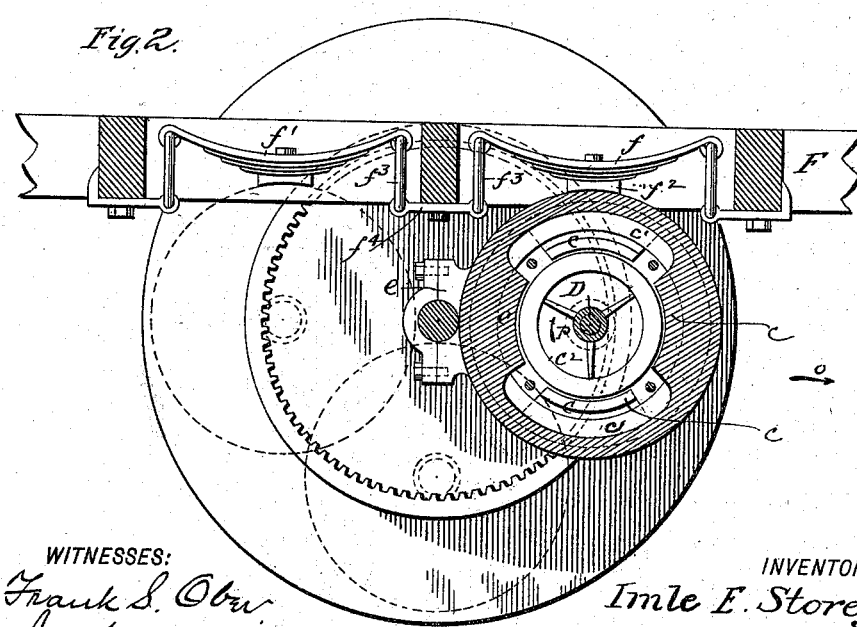

Figure 1 is a plan of a motor mounted in connection with a single pair of driving-wheels, and Fig. 2 is a vertical central section taken at right angles to the axle.

Referring to the drawings by letter, A A represent two driving-wheels mounted upon an axle B. I term these wheels the "driving-wheels" because it is to be understood that the improved method of mounting the motor herein described is best applied to wheels of large diameter, so that the diameter of a motor which is capable of doing the work will be less than the radius of the wheels, for the purpose which will hereinafter appear. On the inside of each wheel is an internal gear $a$, the diameter being somewhat less than that of the wheel.

C represents an electric motor, the construction of which is fully described in my Patent No. 488,041, issued December 13, 1892. In general, however, this motor consists of a cylindrical shell having pole-pieces $c$ projecting inward toward the armature in a peculiar manner. The field-magnet coils $c'$ are concentric with and surround the armature. The armature $c$ rotates between the poles and is mounted on shaft D. The ends of the cylinder are closed in by cup-shaped heads, as shown in Fig. 1, thus protecting the armature and commutator, which is also mounted on the armature-shaft in the usual manner, from injury. The motor is therefore especially adapted for this particular purpose. Upon one side of the motor are attached two boxes $e$, through which the axle of the drive-wheels loosely passes, forming a pivotal support for the motor. These boxes have removable caps to facilitate mounting and dismounting the motor. The motor-shaft is parallel to the axle and extends through the cup-shaped heads, within which it has its bearings, and carries on each end a pinion $d$. These engage, respectively, with the internal gears attached to the drive-wheels. The internal gears each have the same number of teeth, so that the movement of the pinions within them will cause an equal rotation of the drivers.

Above the axle is arranged a portion of the framework F of the truck or vehicle. This may be of any suitable construction, so long as it is adapted to support two spring-buffers $f f'$. The form of the buffer here shown is a leaf-spring carrying an impinging shoe $f^2$, the ends of the spring being connected with links $f^3$, which in turn connect with plates $f^4$, bolted to the frame. I do not confine myself to this or any particular form of buffer, so long as a stop, and preferably a spring-stop of some construction, is arranged upon each side of the axle, at such points that the motor may bear against them when located at its highest position on either side of the axle, as shown in Fig. 2.

The operation is as follows: When the locomotive is stationary and no current is passing through the motor, the motor is suspended in its lowest position below the pivots $a$; that is to say, the armature-shaft is below the axle and in substantially the same vertical plane with it. To start the locomotive in the direction of the arrow $o$, current is sent through the motor in such a direction that the pinions $d$ will rotate in the direction of the arrow $p$. As the locomotive is standing still and as inertia tends to hold it in this condition, the rotation of the pinions will cause them to climb up on the forward side of the drivers and carry the motor with them. During the first few moments, while the motor is moving in a substantially horizontal direction, it has an opportunity to quickly get up speed and generate its own natural protective resistance in the form of counter electromotive force. As the motor continues to climb upward toward the stop $f$, where its armature-shaft will be in substantially the same horizontal plane with the axle, its weight is gradually brought to bear upon the periphery of the wheels, thus tending to rotate them and start the load, and simultaneously the motor is required to gradually lift its own weight. I have calculated that under ordinary conditions the vehicle or load will be started before the motor strikes the stop, and when it does reach the stop it will be rotating at nearly if not quite sufficient speed to prevent the flow of an injurious current. It will be observed that the weight of the motor is applied as a lever, having a center at the axle and length equal to the distance between the center of the axle and the pitch-line of the gears on the armature-shaft. After the vehicle or load is in motion the weight of the motor applied with a certain leverage is constantly at work, but no real gain is believed to be obtained on this account, for it requires an equivalent amount of energy in the form of electric current to maintain the motor in its elevated position.

The normal working position of the motor is against one of the buffers, which is the purchase. Ordinarily the motor would be brought up gently against the buffer, but it is there partially for the purpose of cushioning any stroke which the motor may make.

As soon as the current is shut off from the motor it is immediately carried down to its lowest or starting position by gravity, at which point it is ready to travel up either side of the axle to start in either direction. It therefore has a swing of about one hundred and eighty degrees around the axle.

A motor of the type herein described is best adapted for this locomotive, because its width or diameter for a given horse-power is the minimum. It is obvious that any other well-known form of motor can be used if the driver is large enough; but the form herein described is preferred. A motor having a greater width than the radius of the wheels may be used where the rails stand above the roadway.

Having thus described my invention, I claim—

The combination of a shaft or axle, an electric motor mounted upon the same and adapted to swing thereon, a gear-wheel also mounted on said axle or shaft and with which the motor armature-shaft is geared, and a stop limiting the movement of the swinging motor, the motor being free to swing from a point vertically below the shaft or axle to a point in a horizontal plane with the shaft or axle, substantially as described.

In testimony whereof I subscribe my signature in presence of two witnesses.

IMLE E. STOREY.

Witnesses:
WM. A. ROSENBAUM,
JOS. J. UHL.